Sept. 12, 1961  D. L. SPOONER  2,999,932
MEASURING SYSTEM
Filed Dec. 12, 1957
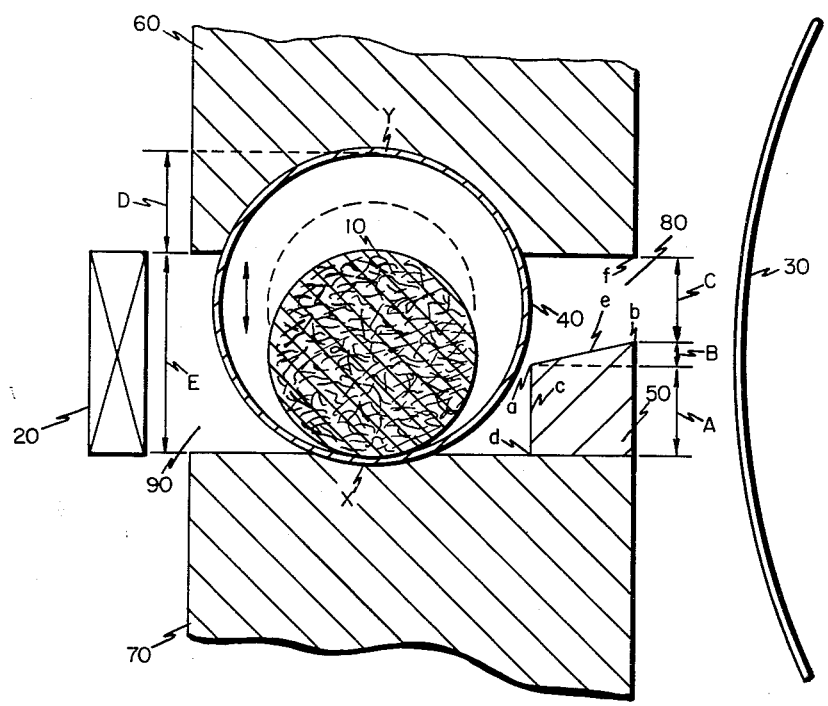
Fig.1
Fig.2
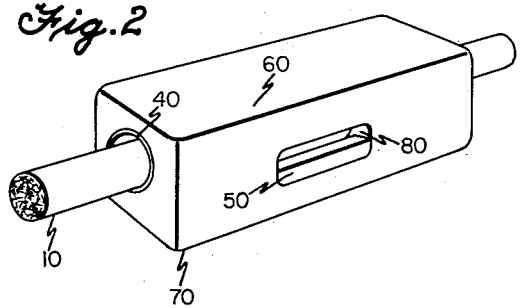
INVENTOR
David L. Spooner
By Anthony D. Cennamo

United States Patent Office 2,999,932
Patented Sept. 12, 1961

2,999,932
MEASURING SYSTEM
David L. Spooner, Columbus, Ohio, assignor to Industrial Nucleonics Corporation, a corporation of Ohio
Filed Dec. 12, 1957, Ser. No. 702,405
1 Claim. (Cl. 250—83)

This invention relates generally to a radioactive material absorption measuring system and more particularly to method and means of controlling the amount of penetrative radiation impinging on a radioactive detector to more accurately indicate the absorption characteristic of the material under measurement.

In any measuring system utilizing a radioactive source of penetrative radiation, in which the material being measured absorbs some of the incident radiation, a detector; e.g., an ionization chamber, responds to the radiation not absorbed by the material in a manner proportional to the weight or mass of the absorber. If the absorber, while located between the source and detector, should move relative to the source and detector (transverse to the direction of the normal movement of the material passing through the measuring system) an effect called flutter will alter the detector output. This change in position may erroneously be interpreted as a weight or mass change.

It has been shown that if an absorber of finite dimensions is located between a uniform source and a uniform detector represented by infinite parallel planes, the flutter effect will not occur. Systems have been proposed, therefore, to curtail or restrict the movement of the material passing between the source and absorber. These systems have been unsuccessful and are not acceptable to an industrial process where measurement of a continuous product is required. The present invention provides method and means of overcoming this flutter effect by controlling the radiation pattern without interferring or changing in any manner the area for the material to pass between the source and chamber, nor to restrict the movement of the material.

It is accordingly an object of the present invention to provide means for a continous radiation detection measurement process to overcome the effect on the detector output caused by the relative movement of the material as it passes between the source and detector.

It is another object of the present invention to provide said means without restricting in any manner the area for the material under measurement to pass.

Another object of the present invention is to provide said means that does not restrict said relative movement nor is in contact with the material under measurement.

Still another object of the present invention is to provide means to overcome the effect of said relative movement that is inexpensive and readily adaptable to present day processes.

Further objects and attainments of the present invention will become apparent from the detailed description taken in conjunction with the drawings in which:

FIG. 1 is a preferred embodiment of the present invention incorporated in a source-detector unit of a measurement process.

FIG. 2 is a perspective view of a source-detector unit embodying the present invention.

The following detailed description of the preferred embodiment of FIG. 1 is with respect to a radioactive measuring system particularly adaptable to a cigarette making machine. It is understood, of course, the principles of the present invention may be readily adaptable to other measuring systems and for other processes.

FIG. 1 is a cross-section of a cigarette making machine source-detector unit incorporating the present invention. The cylindrical absorber 10, which in this instance may be a cigarette rod, is supported as it passes between a field of radiation emanating from a source 20 by a thin-walled tube 40. The diameter of tube 40 is substantially greater than that of the absorber 10, primarily to permit free movement of the absorber 10 therethrough. The tube 40 is positioned with respect to a source aperture 90 and a detector aperture 80 to permit radiation from source 20 to pass through its center and lower portion, shown as area E. This position is chosen since the absorber 10 will normally "ride" on the bottom portion of the tube 40. Rather than to permit normally uninhibited radiation to pass from source 20 to detector 30 the air gap in tube 40 outlined as area D is blocked by the upper housing 60. In other words the aperture 80—90 through housing 60, permitting radiation to pass through area E, is designed to be only slightly wider than the diameter of the absorber 10; and yet, the pass tube 40 is of sufficient diameter to permit free movement of the rod absorber 10. From the configuration shown, it is apparent that with a completely uniform stationary absorber 10 in the tube 40 the amount of radiation impinging on detector 30 will vary at different points thereon.

Interposed between the tube 40 and detector 30 in the aperture 80 and in contact with the lower structure 70, is a block 50 of radiation absorbent material. Block 50 is so positioned in the aperture 80 that its surface $c$ is perpendicular to the normal lines of radiation to absorb any radiation striking this surface. The surface $e$ of block 50 is highly polished and operable to reflect radiation; whereas neither of the surfaces of block 50 interferes with the radiation pattern in that area shown between points $f$ of structure 60 and $b$ of block 50.

In operation of the invention, the absorber 10 is so positioned in the aperture 80 that the radiation passing through its lower portion (identified as region A) is absorbed by block 50, the radiation passing through the center portion (identified as region B) is reflected by surface $c$ of block 50, and the radiation passing through upper portion (identified as region C) of the absorber is passed uninhibited.

When the absorber 10 moves or flutters upward in a direction from wall $x$ to wall $y$ of tube 40, region C will have less radiation passing therethrough since the central portion of absorber 10 has moved upward into the uninhibited region; the region B will have passed therethrough more radiation since it will now be in the lower portion of the absorber 10 and hence more radiation is reflected.

It is seen therefore, as absorber 10 flutters between walls $x$ and $y$ the amount of radiation passing through area C and the amount of radiation reflected in area B will vary. To compensate for the altering effect on detector 30 the angle of the surface $e$ for the given area between points $a$ and $b$ of block 50 is so chosen to reflect that amount of radiation that just compensates for the varying amounts of radiation passing through region C. That is, when absorber 10 is in the position shown (resting on wall $x$) the surface $e$ will reflect a certain amount of radiation on detector 30. When absorber 10 advances towards wall $y$ surface $e$ will have more radiation incident on it and therefore more radiation will be reflected to the detector 30 but area C will pass less radiation due to the greater region of absorber 10.

The angle and the area of the surface $e$ and the height and width of the block 50 is chosen so that as the position of the absorber 10 within the tube 40 changes the amount of radiation reflected from the sloping face of the block 50 into the detector 30 also changes in magnitude and in such a way as to compensate for the change in amount of radiation entering the detector without reflection.

The theory of operation of controlling the aperture size to eliminate the flutter effect is at present not fully appreciated. However, the area and angle of surface $e$ and the height and width of block 50 to give optimum results may be chosen empirically.

To illustrate the effectiveness of the invention a detector aperture 80 of the same size as the source aperture 90, that is without the block 50 in the path of radiation, a lateral movement of the absorber 10 of 0.030" caused a signal variation from the detector of more than 5%. This signal variation would under normal circumstances be attributed by an operator to weight variation of the absorber 10, whereas, with the same absorber 10 and a modified aperture 80, that is with block 50 in place, the same 0.030" absorber movement caused only an indicated weight change of less than ½%.

Referring to FIG. 2 there is shown a source-detector unit, incorporating the present invention, in perspective. Structure 70 has an elongated hole bored therethrough to permit the insertion of tube 40. Tube 40 is the pass tube that guides the rod under measurement between the source and detector. To permit the measurement of the rod a rectangular hole is bored perpendicularly to the tubular hole resulting in the aperture 80 as shown. The detector 30 as well as the source 20 is not shown. Positioned in aperture 80 is the block 50 in accordance with the present invention. It can be appreciated at this point that when aperture 80 through structure 70 is machined that block 50 may be left in as a part of the structure.

Although only a certain configuration is shown, it is apparent that variations may be had without departing from the basic principles of the present invention.

I claim:

In a continuous measuring system for rod material moving freely through a pass tube, said system including a radio-active source of penetrative radiation, a detector electrically responsive to radiation incident thereat, and means for mounting said source and said detector adjacent said tube and in axial alignment with an aperture extending transversely therethrough, the height of said aperture being substantially equal to the diameter of said rod material, the improvement comprising a block of radiation absorbent material interposed in the aperture between said rod material and said detector and including a first surface transversing the width of said aperture and extending upwardly in perpendicular relationship to a plane paralleling the horizontal diameter of said rod material and extending therethrough below said diameter wherein radiation passing below said plane is substantially absorbed by said block, and a second surface extending upwardly and outwardly from said first surface toward said detector wherein radiation passing through a substantially small central portion of said rod material above said plane is reflected to fall upon said detector.

References Cited in the file of this patent

UNITED STATES PATENTS

| 2,629,831 | Atchley | Feb. 24, 1954 |
| 2,883,552 | Faulkner et al. | Apr. 21, 1959 |

FOREIGN PATENTS

| 738,329 | Great Britain | Oct. 12, 1955 |